Oct. 21, 1952 F. J. ADAMS 2,614,358
COMBINATION CHUM POT, BOTTOM SOUNDER, AND BAIT BUCKET
Filed Dec. 22, 1945 3 Sheets-Sheet 1

INVENTOR.
FREDERICK J. ADAMS
BY Joshua R. H. Potts
HIS ATTORNEY.

Oct. 21, 1952        F. J. ADAMS        2,614,358

COMBINATION CHUM POT, BOTTOM SOUNDER, AND BAIT BUCKET

Filed Dec. 22, 1945        3 Sheets-Sheet 2

INVENTOR.
FREDERICK J. ADAMS
BY Joshua R. H. Potts
HIS ATTORNEY.

Oct. 21, 1952 F. J. ADAMS 2,614,358
COMBINATION CHUM POT, BOTTOM SOUNDER, AND BAIT BUCKET
Filed Dec. 22, 1945 3 Sheets-Sheet 3

INVENTOR.
FREDERICK J. ADAMS
BY Joshua R. H. Potts
HIS ATTORNEY.

Patented Oct. 21, 1952

UNITED STATES PATENT OFFICE 2,614,358

COMBINATION CHUM POT, BOTTOM SOUNDER, AND BAIT BUCKET

Frederick J. Adams, Philadelphia, Pa.

Application December 22, 1945, Serial No. 636,694

1 Claim. (Cl. 43—55)

This invention relates to a fishing accessory and particularly to a combination device embodying the elements for determining the character of the river bottom or the like, for catching and storing live bait, such as minnows, and for luring fish.

It is desirable to provide a perforated container for holding chopped portions of fish, mussels, or other sea foods and the like for luring fish and, as a similar device may also be adapted for catching and storing live bait, it has been found advantageous to combine these elements into a combination container and in addition form the cover thereof so that it may be used for sounding.

This invention contemplates a unique container, which is so arranged that it is adapted for catching and storing bait, for bottom sounding, and for luring fish.

It has been found that fish do not frequent waters where the bottom is sandy and smooth because water passing thereover scours the bottom removing food, whereas where stones or pebbles are present in the sand food is held thereby and fish will frequent these areas.

This invention, therefore, involves the use of a cover for a fish lure, chum pot, or bait bucket, which is relatively heavy and which, with the under surface covered with soap, grease, or other adhesives, may be lowered to contact the bottom and may be raised to determine whether the bottom is sandy or contains gravel.

A chum pot or fish lure also requires a weight, such as an anchor, to hold it in position when it is lowered in the water and the heavy cover is not only adapted for bottom sounding but also functions as a weight to anchor the lure.

In a fish lure of this type, it is desirable to have a perforated top and bottom as well as the perforated sides as portions of the fish filling should be forced out of the perforations to enable fish to taste the bait. Oils also ooze out through the said perforations and follow water currents considerable distances from the lure and thereby attract fish to the area in which the lure is positioned.

This invention also involves the use of a perforated cover of this type with an opening at the center wherein the device may also be used for catching live bait, the fish entering the container through the opening in the cover and remaining therein.

In storing live bait, it is also desirable to have a perforated container and, in addition, it is desirable to position the container adjacent the surface of the water and maintain it in substantially a horizontal position. For this purpose, the invention contemplates the use of a float in the form of a hollow ball attached to one side of the container with a weight, for which the cover is used, attached to the opposite side and with the perforated cover reversed to bulge outward.

Devices used for bottom sounding are subject to catching in snags, such as rock formations and the like, and for this reason the invention includes a cover with a rounded or convex upper surface whereby it will slide away from such snags and free itself.

The purpose of this invention is to provide a combination fishing device wherein a fisherman is only required to pack or carry one article instead of several for sounding and luring, and catching and storing live bait.

With these ends in view, the invention embodies a cylindrical pot having a perforated bottom, perforated sides with studs extending from the upper ends thereof, a perforated concave closure, the position of which may be reversed, adapted to be secured to said studs, a solid cover forming a weight also adapted to be secured to said studs, and a hollow ball forming a float, adapted to be secured to said studs.

The object of the invention is to provide means for combining a plurality of elements wherein the elements may be used in combination or individually in different positions to produce a fishing device adapted to be used for bottom sounding, luring, and live bait catching and storing.

Another object is to provide a combination fishing device in which a plurality of elements are associated for accomplishing one or more purposes, which is of a comparatively simple and inexpensive construction.

For a full and more complete understanding of the invention, reference may be had to the following description and accompanying drawings, wherein.

Figure 2:
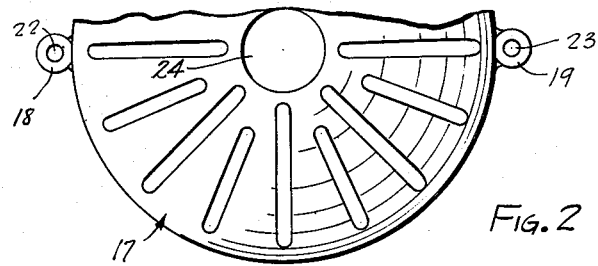
Figure 2 is a plan view with parts broken away.

Referring now to the drawings wherein like reference characters denote corresponding parts, numeral 10 indicates the container, numeral 11 the cover or weight member and numeral 12 the float.

The container 10 is formed with a perforated shell as illustrated and the lower end thereof is provided with a perforated bottom 13, which is permanently attached thereto. The sides of the shell bend inward, forming a flange 14 around the upper end, and securing members or studs 15 and 16 are permanently mounted in this flange on opposite sides of the container 10.

Figure 5:
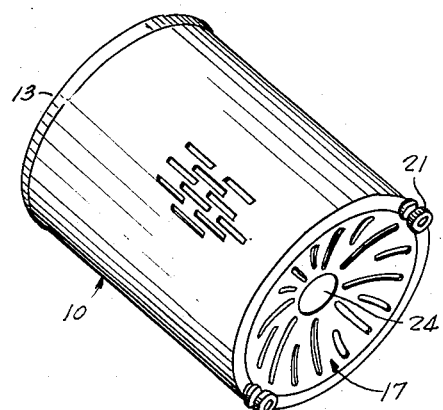
Figure 5 is a view showing the device as used as a minnow or bait trap.
Figure 7:
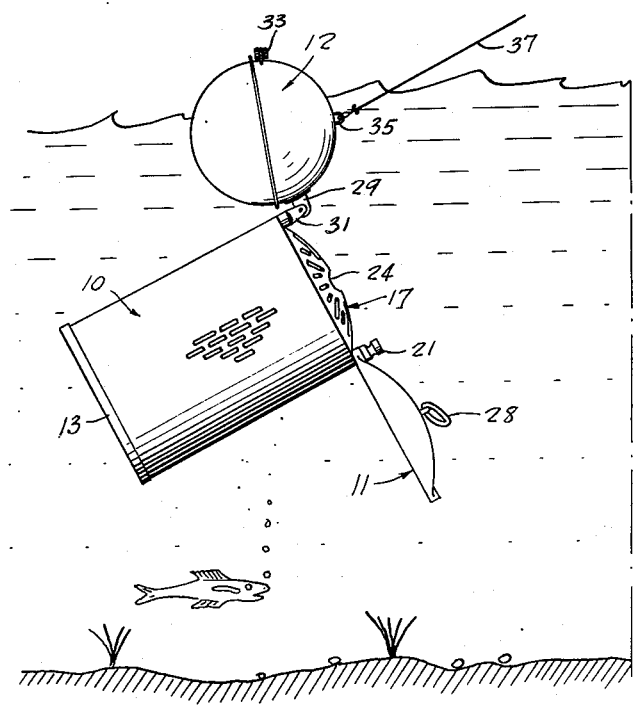
Figure 7 illustrates the use of the device for bait storage.

The auxiliary cover or adaptor 17, having projections 18 and 19 at opposite sides, may be secured to the end of the container by thumb nuts 20 and 21 with the openings 22 and 23 in the projections 18 and 19 placed over the studs 15 and 16 as shown in Figure 5. The adaptor 17 is also perforated and is dished or formed so that it will assume a concave position in the position shown in Figures 1 and 5 or, when reversed as shown in Figure 7, it will be convex, providing a concave surface for receiving fish into the trap or container and a convex surface for holding the fish therein. The center of this adaptor is provided with a receiving opening 24 through which fish may enter and through which they may be removed by bouncing or striking the opposite end with the container in an inverted position.

Figure 6:
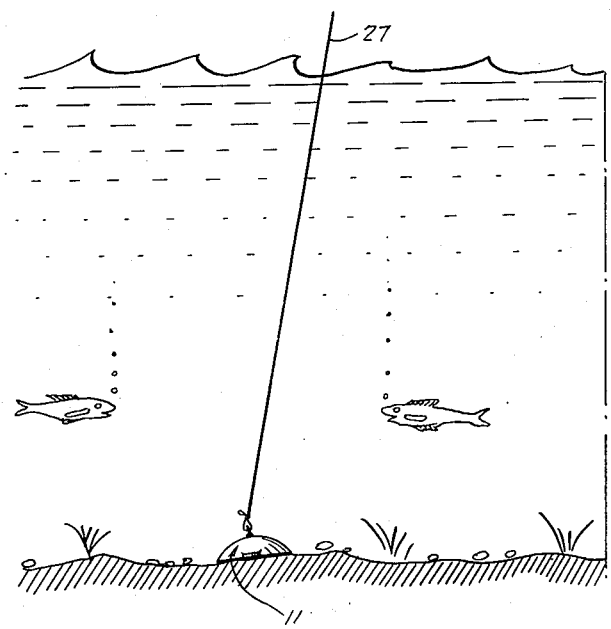
Figure 6 illustrates the use of a cover for bottom sounding.

The cover 11 is also provided with openings 25 adapted to receive the studs 15 and 16 and this may also be secured to the end of the container by the thumb nuts 20 and 21. This cover is substantially solid, thereby providing a weight having a diameter substantially the same as that of the container 10, and the under surface is formed with a concave recess 26 over the surface of which soap, grease or the like may be spread. It is therefore adapted to be used as a bottom sounder and when lowered in the water by a cord 27, as shown in Figure 6, particles of gravel or sand will adhere to the sticky substance on the under surface whereby the nature of the bottom may readily be determined. The cover is provided with a ring 28 to which the cord may be attached.

Figure 4:
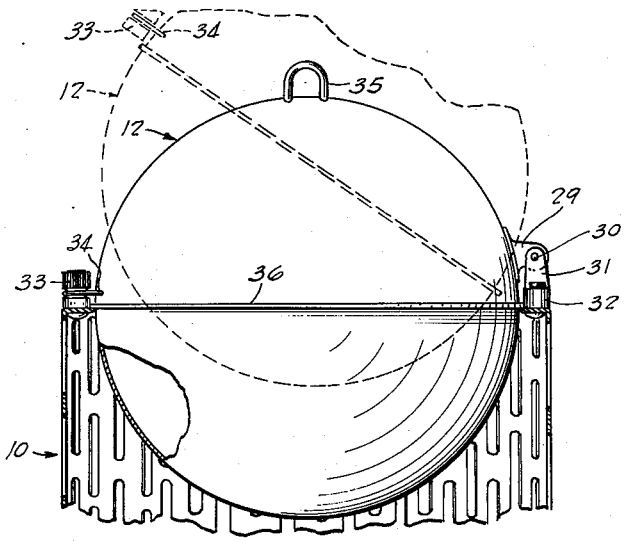
Figure 4 is a detail showing a section through the upper end of the container with a float incorporated therein.
Figure 3:
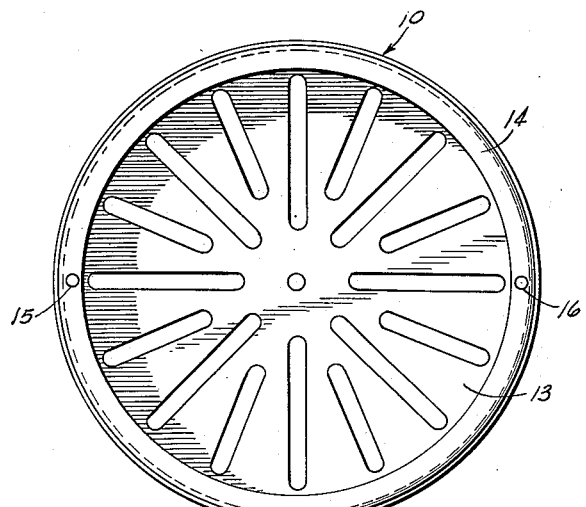
Figure 3 is a plan view of the upper end of the container with the covers omitted.

The float 12 may be used in the upper end of the container, as shown in Figure 4, or to support the container, as illustrated in Figure 7. The float is provided with a projection 29, pivotally mounted on a pin 30 in the upper end 31 of a nut 32, adapted to be screwed on one of the studs 15 or 16, and at the opposite side it is provided with a freely rotatable nut 33 held in a wire loop 34 extending therefrom. On the float is an eye 35 to which a cord may be attached and around the center is a circumferential flange 36 that is adapted to rest upon the upper surface of the flange 14 at the upper end of the container. The float may be attached to the container as shown in Figure 4, forming a hinged cover that may readily be opened to remove bait as desired, or it may be attached as shown in Figure 7, at one side, and held by a cord 37. The cover 11 may be attached at the opposite side to form a weight.

The construction of the device will be readily understood from the foregoing description.

Figure 1:
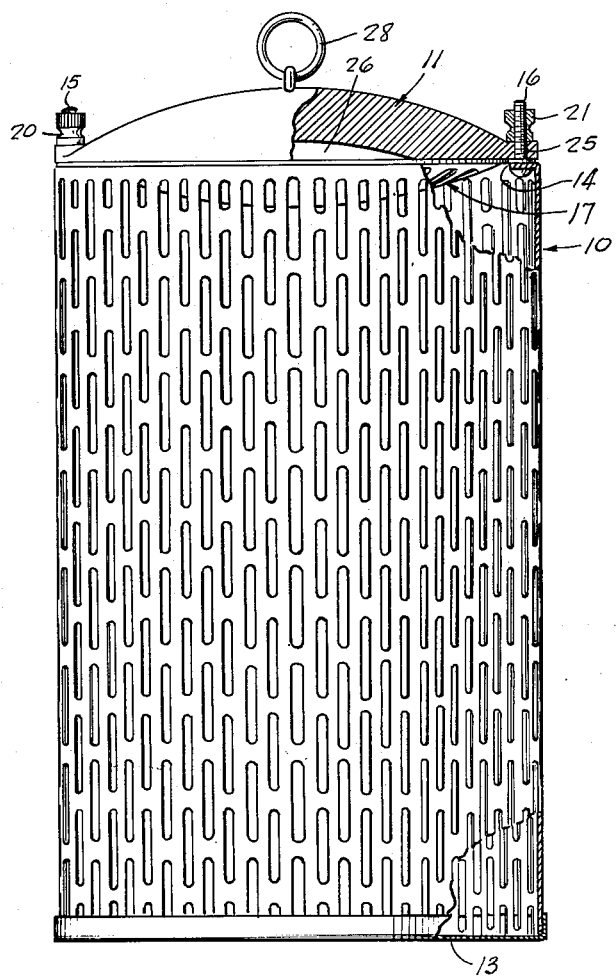
Figure 1 is a view showing a side elevation of the device with parts broken away and parts omitted.

The device may be used as a chum pot with the parts arranged as shown in Figure 1, and in this use the adaptor 17 may be omitted. In this use, it may be filled or partially filled with any suitable substance for luring fish. Ground fish, mussels, or menhaden, commonly called mossbunker, are used extensively for this purpose. It is preferable to place the contents under pressure so that parts thereof will project outward through the perforations whereby fish may taste thereof. The contents develop an oil slick which follows the current for considerable distances and attracts fish to the lure. In this use, the cover 11 forms the weight, usually provided in chum pots for anchoring the device or for holding it downward in the water.

When used as a live bait trap, the contents are removed and the adaptor or concave auxiliary cover is used on the open end, as shown in Figure 5, so that fish may enter through the opening 24. In this use, the container may be suspended by a cord or may have the float, and also the cover, as a weight attached thereto as may be desired.

When used as a floating bait bucket, the position of the adaptor or auxiliary cover may be reversed, as shown in Figure 7, and the float and weight may be attached or the adaptor and weight may be removed and the float attached to form a float and closure, as shown in Figure 4. When used as shown in Figure 7 the weight member 11 is mounted on one of the securing members 15 or 16 and extends outwardly from the container 10 and the ball-shaped float 12 is secured to the other of the securing members on the opposite side of the container 10 from the weight member 11 and extends outwardly of the container 10 whereby the float member 12 and the weight member 11 will maintain the container 10 submerged with the longitudinal axis thereof inclined with respect to the surface of the water.

The cover 11 may also be removed and used independently for bottom sounding as described.

While a preferred specific embodiment of the invention is hereinbefore set forth, it is to be clearly understood that the invention is not to be limited to the exact construction illustrated and described because various modifications of these details may be provided in putting the invention into practice within the purview of the appended claim.

What is claimed is:

A fishing device comprising, in combination, a perforated cylindrical container having an open end, a perforated dish shaped cover for the open end of said container, said cover having a central fish receiving opening therein, securing members located at opposite sides of the open end of said container, said cover being detachably secured thereto, a weight member having a diameter substantially the same as that of the container mounted on one of said securing members and extending outwardly from said container, and a ball shaped float member secured to another securing member on the opposite side of the container from the weight member and extending outwardly of said container, whereby the float and weight members will maintain the container submerged with the longitudinal axis thereof inclined with respect to the surface of the water, said float being hingedly and separably connected to said securing means and being adapted to assume a position in which it is nested in the open end of said container.

FREDERICK J. ADAMS.

REFERENCES CITED

The following references are of record in the file of this patent:

UNITED STATES PATENTS

| Number | Name | Date |
|---|---|---|
| 313,453 | Rutter | Mar. 3, 1885 |
| 777,382 | LeBeau | Dec. 13, 1904 |
| 951,157 | Todd | Mar. 8, 1910 |
| 1,436,835 | Van Pelt | Nov. 28, 1922 |
| 1,442,683 | Kelly | Jan. 16, 1923 |
| 1,587,785 | Marsh et al. | June 8, 1926 |
| 1,834,329 | Bolte | Dec. 1, 1931 |
| 2,049,789 | Webster | Aug. 4, 1936 |
| 2,055,912 | Schonger | Sept. 29, 1936 |
| 2,182,160 | Nelson | Dec. 5, 1939 |

FOREIGN PATENTS

| Number | Country | Date |
|---|---|---|
| 537,726 | Great Britain | July 3, 1941 |